Feb. 25, 1947.   G. A. SPENCER   2,416,414
SHOVEL
Filed Aug. 4, 1945

Inventor
George A. Spencer

By Clarence A. O'Brien
and Harvey B. Jacobson
Attorneys

Patented Feb. 25, 1947

2,416,414

UNITED STATES PATENT OFFICE 2,416,414

SHOVEL

George A. Spencer, North Platte, Nebr.

Application August 4, 1945, Serial No. 608,926

3 Claims. (Cl. 294—58)

1

This invention relates to a shovel and it is one object of the invention to provide a shovel provided with an auxiliary handle which is located over the usual shovel handle and in such relation to the conventional shovel handle that the shovel, when heavily loaded, may be very easily lifted and carried from one place to another or the shovel manipulated so that material in the scoop of the shovel may be easily thrown into a wagon or other vehicle or onto a pile of material.

A further object of the invention is to so form the auxiliary handle that it has a bar extending longitudinally of the bar of the main handle of the shovel and a hand hold at the front end of the bar, the bar being so located that it may be grasped and allowed to slide through a person's hand when shoveling and the hand hold at the front of the bar being so located that when it is grasped a load taken up by the scoop of the shovel will be well balanced and allowed to be lifted and carried with minimum effort.

Another object of the invention is to provide an auxiliary handle capable of being applied to shovels of a conventional construction without making changes in the construction thereof.

The invention is illustrated in the accompanying drawings, wherein.

Figures 1, 2, 3:
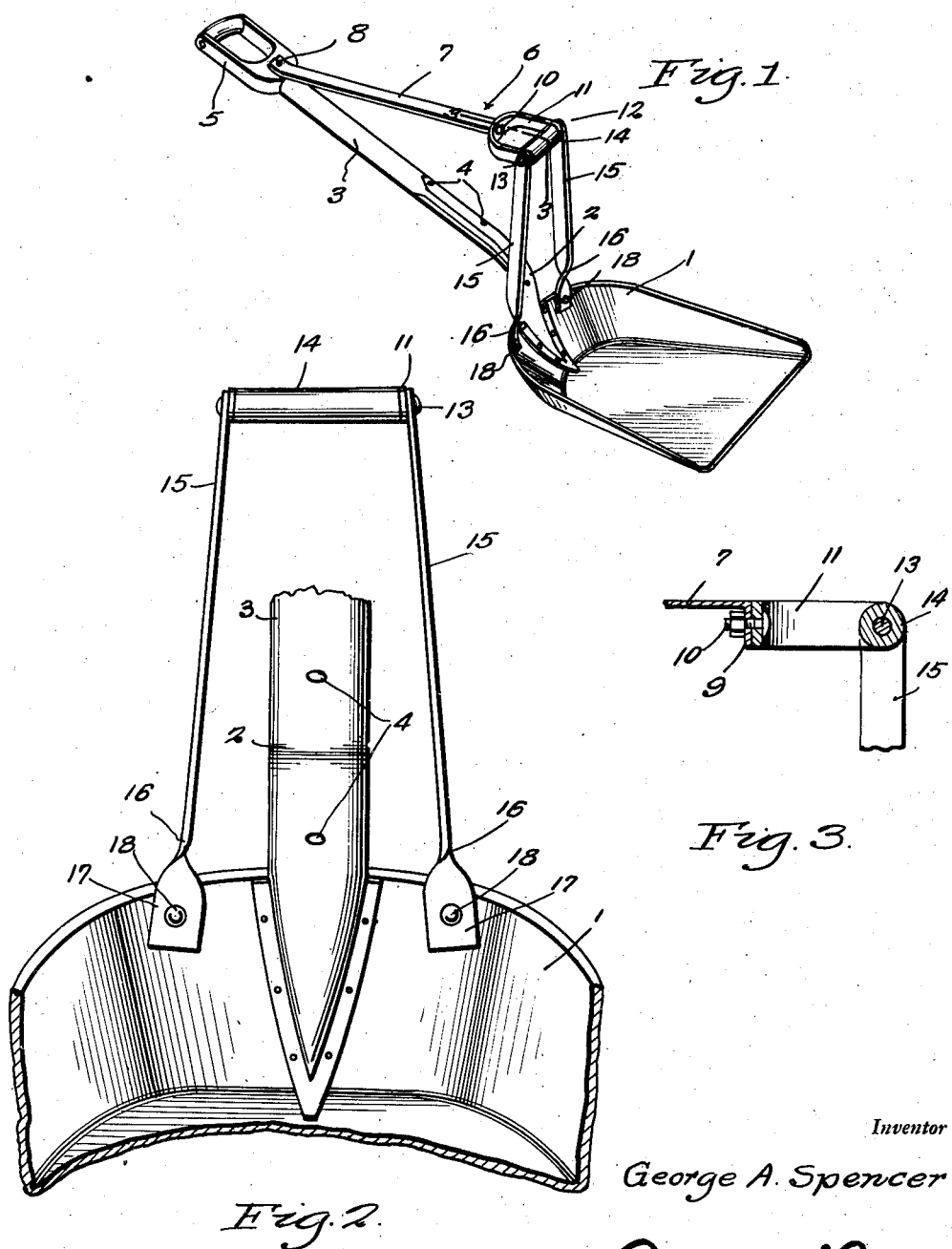
Figure 1 is a perspective view of a shovel equipped with the improved auxiliary handle.
Figure 2 is a fragmentary view upon an enlarged scale showing the hand hold at the front end of the auxiliary handle and the struts connecting it with the scoop of the shovel.
Figure 3 is a fragmentary sectional view taken along the line 3—3 of Figure 1.

The shovel to which the auxiliary handle has been shown applied is of a conventional construction and has the usual scoop 1 equipped with a rearwardly extending shank 2 in which a handle 3 is secured by pins 4. The handle 3 is of the customary length and at its rear end is formed with a hand hold 5, by means of which the handle is grasped when using the shovel. The auxiliary handle which is indicated in general by the numeral 6 has a shank 7 formed from a strip of strong metal. This shank extends longitudinally of the handle 3 and is disposed over this handle with its rear end secured flat against the forward portion of the hand hold 5 by a fastener 8. The strip or shank 7 extends forwardly in diverging relation to the handle 3 and at its front end is bent to form a depending tongue 9 through which a bolt 10 is passed to secure the tongue to the U-shaped yoke 11 of a hand hold 12. The arms of the yoke 11 extend forwardly and are formed to

2 receive a pin 13 by means of which a tubular grip 14 is mounted between forward ends of the arms of the yoke. The pin 13 also passes through upper ends of struts 15 which are formed from metal strips. These struts 15 extend downwardly from the yoke in diverging relation to each other and have their lower end portions twisted, as shown at 16, to form attaching feet 17 which are secured by rivets 18 to the rear portion of the scoop 1 in spaced relation to opposite sides of the front end of the shank 2.

When the shovel equipped with the auxiliary handle is in use, the hand hold 5 is grasped with one hand and the other hand may grasp the shank 7 of the auxiliary handle and the scoop thrust into material. As the scoop is thrust into the material, the hand grasping the shank 7 may be allowed to slide along this shank and the shovel then lifted and the material thrown into a vehicle or upon a pile. If the material taken up by the scoop is to be carried from one place to another, the hand hold 12 will be grasped by the tubular grip 14 and since this grip is located over the forward portion of the shank 2, the weight will be so distributed that when one hand is grasping the grip 14 and the other the grip of the hand hold 5, the loaded shovel may be very easily lifted and carried without excessive strain upon the person using the shovel.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having thus described the invention, what is claimed is:

1. In combination with a shovel having a scoop provided with a rearwardly extending shank and a handle secured in the shank and provided with a hand hold at its rear end; an auxiliary handle for the shovel comprising a strip extending longitudinally of the main handle over the same and having its rear end secured upon the forward portion of the hand hold of the shovel handle, a U-shaped yoke, the forward end portion of said strip being bent downwardly to form a tongue, a fastener passing through the tongue and the center portion of said yoke and securing the yoke to the tongue with its arms projecting forwardly from said strip, a hand grip extending between forward ends of said arms, struts disposed vertically against outer side faces of forward ends of the arms of said yoke, a pin passing through said hand grip with its end portions passing through arms of the yoke and upper ends of said struts, said struts extending downwardly in diverging relation to each other at opposite sides of the shank of said scoop and having their lower ends twisted to form attaching feet overlapping portions of the scoop at the rear thereof in transverse spaced relation to the shank of the scoop, and fasteners passing through the feet of said struts and through portions of the scoop overlapped by the feet.

2. A shovel having a scoop provided with a rearwardly extending shank and a handle carried by the shank and provided with a hand hold at its rear end, and an auxiliary handle for said shovel comprising a strip secured to the hand hold and extending forwardly over the handle and the shank in vertical spaced relation thereto, a yoke mounted at the forward end of said strip and having forwardly extending arms, a hand grip extending between front ends of the arms of said yoke, struts disposed vertically at opposite sides of the front end of said yoke, a pin passing through the hand grip and through front ends of the arms and upper ends of said struts, and said struts extending downwardly and having their lower ends bent to form feet secured to the rear portion of the scoop in transverse spaced relation to opposite sides of the shank.

3. A shovel, comprising in combination, a scoop having an upstanding marginal flange, a rearwardly extending shank secured to said flange, a handle secured at one end thereof in said shank, a hand hold at the remaining end of said handle, and an auxiliary handle comprising a strip secured at one end thereof to the forward portion of said hand hold, said strip extending forwardly in a divergent relationship with respect to said handle and in vertical alignment therewith, a downturned tongue at the remaining end of said strip, a strap secured medially of its length to said tongue and being arcuated to form a U-shaped, forwardly extending yoke, a transversely disposed pin connecting together the free extremities of said yoke, a tubular hand grip mounted on said pin, and a pair of vertically disposed struts, the upper ends of said struts being secured by means of said pin to said yoke at the relatively opposite ends of said hand grip, said struts extending downwardly in a mutually divergent relationship and having the lower end portions thereof twisted to form attaching feet, said feet being secured to said flange at the relatively opposite sides of said shank.

GEORGE A. SPENCER.

REFERENCES CITED

The following references are of record in the file of this patent:

UNITED STATES PATENTS

| Number | Name | Date |
|---|---|---|
| 1,449,702 | Sizemore | Mar. 27, 1923 |
| 875,504 | Clark | Dec. 31, 1907 |
| 304,067 | Boyles | Aug. 26, 1884 |